March 17, 1931.  F. C. LAUREYS  1,796,934
APPARATUS FOR MAKING CONFECTIONS
Filed March 17, 1930      6 Sheets-Sheet 1
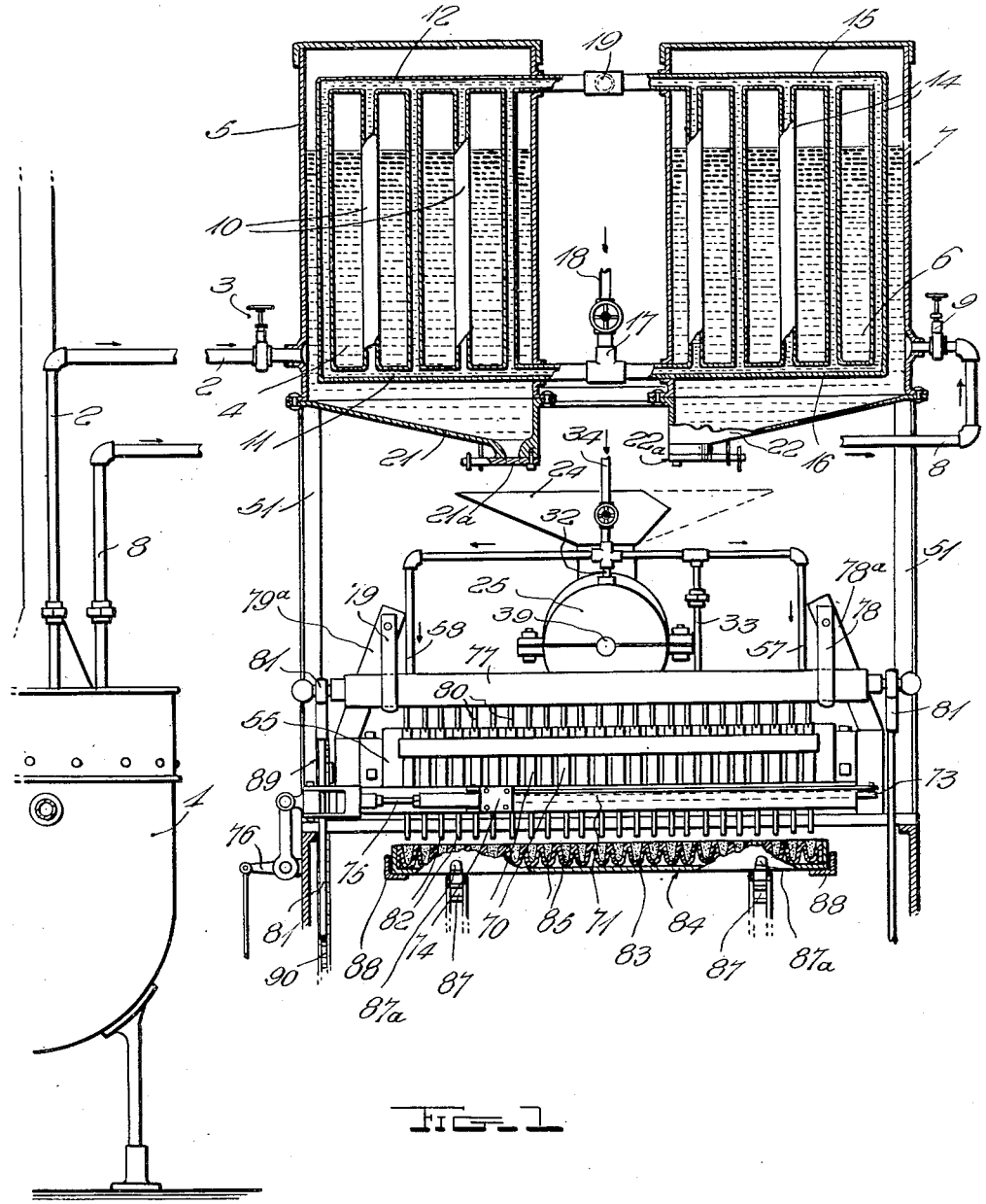
INVENTOR.
Peter C. Laureys,
BY John O. Brady
ATTORNEY.

March 17, 1931. P. C. LAUREYS 1,796,934
APPARATUS FOR MAKING CONFECTIONS
Filed March 17, 1930 6 Sheets-Sheet 2
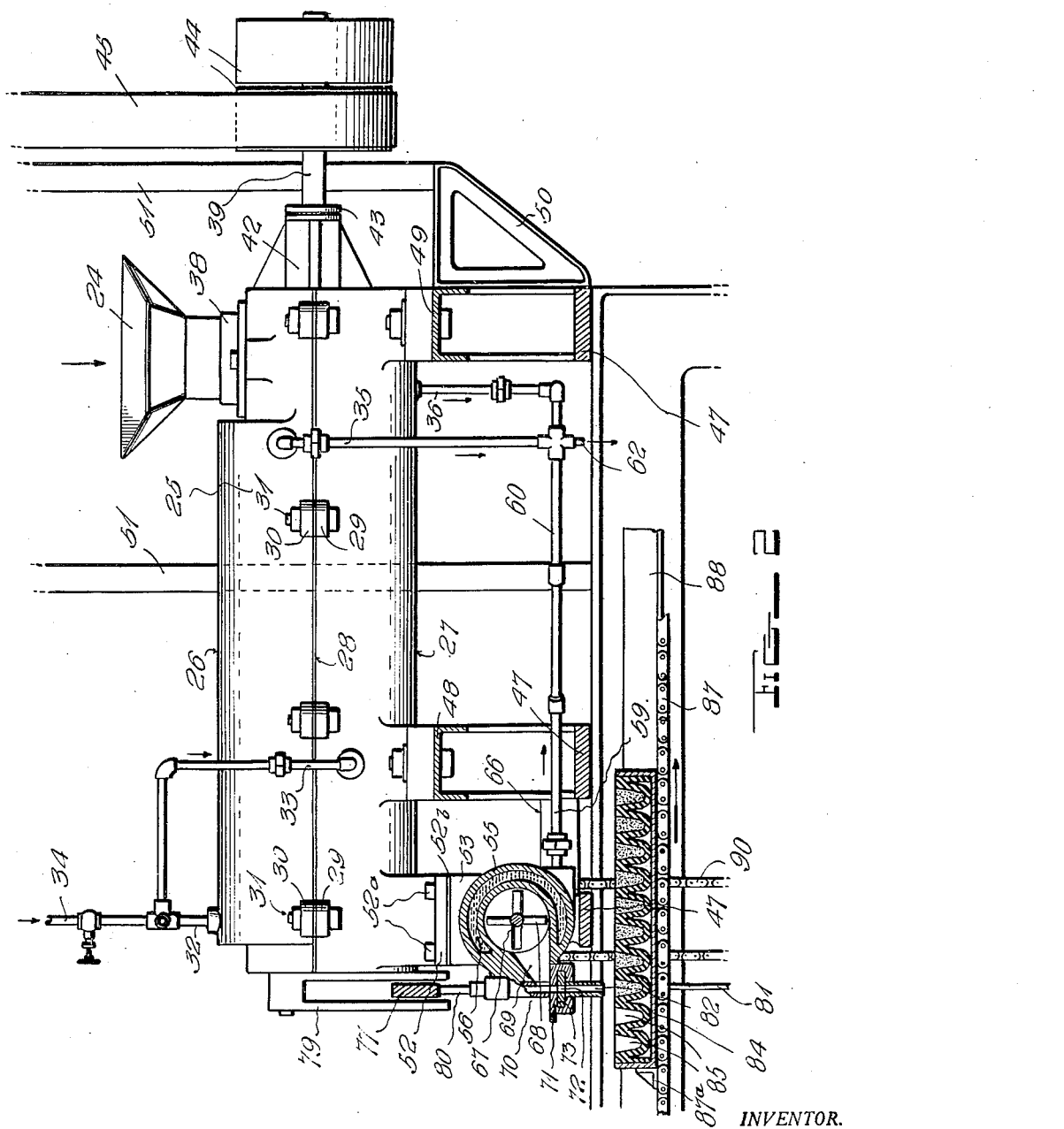
INVENTOR.
Peter C. Laureys,
BY John B. Brody
ATTORNEY.

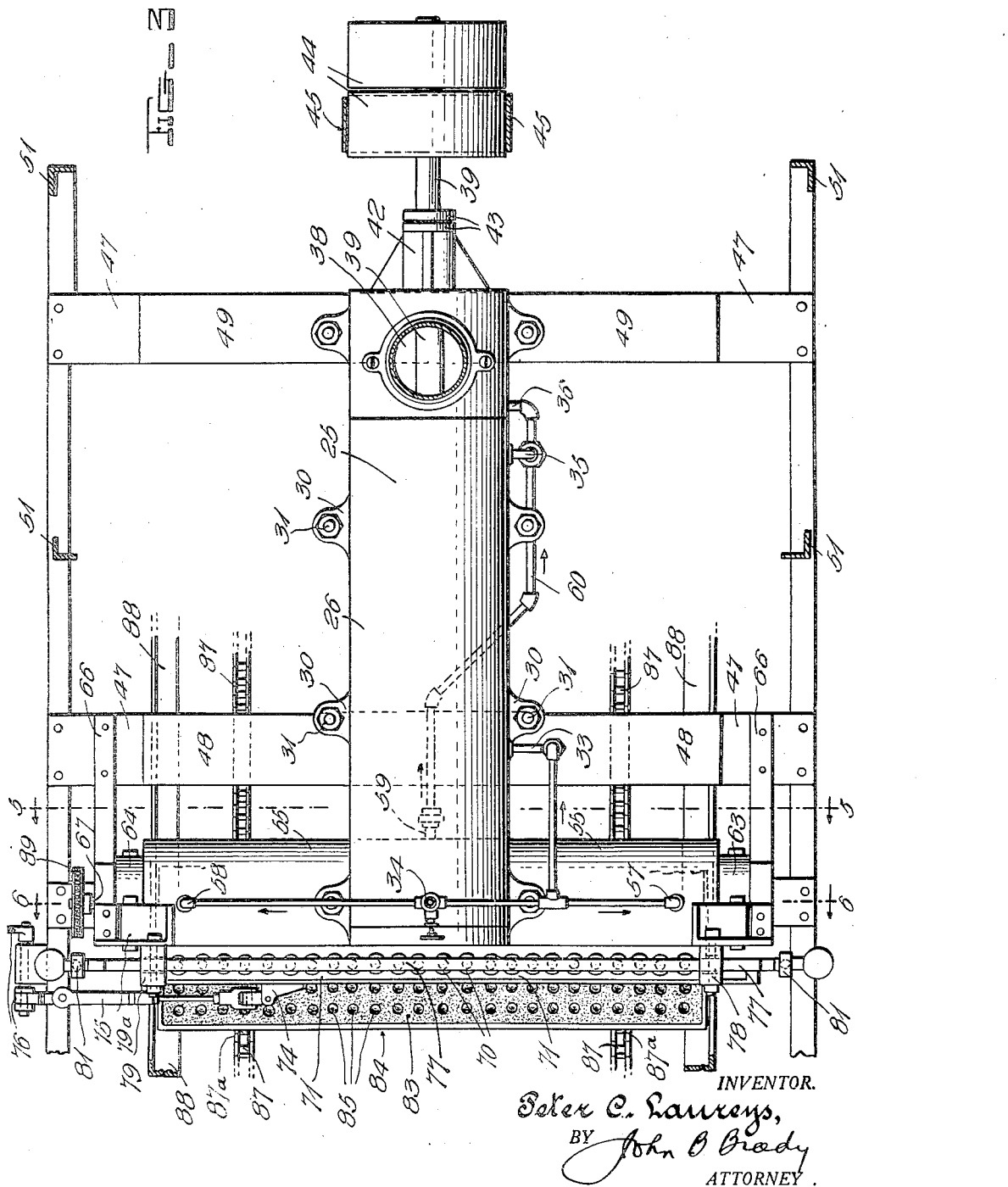

March 17, 1931. P. C. LAUREYS 1,796,934
APPARATUS FOR MAKING CONFECTIONS
Filed March 17, 1930 6 Sheets-Sheet 4
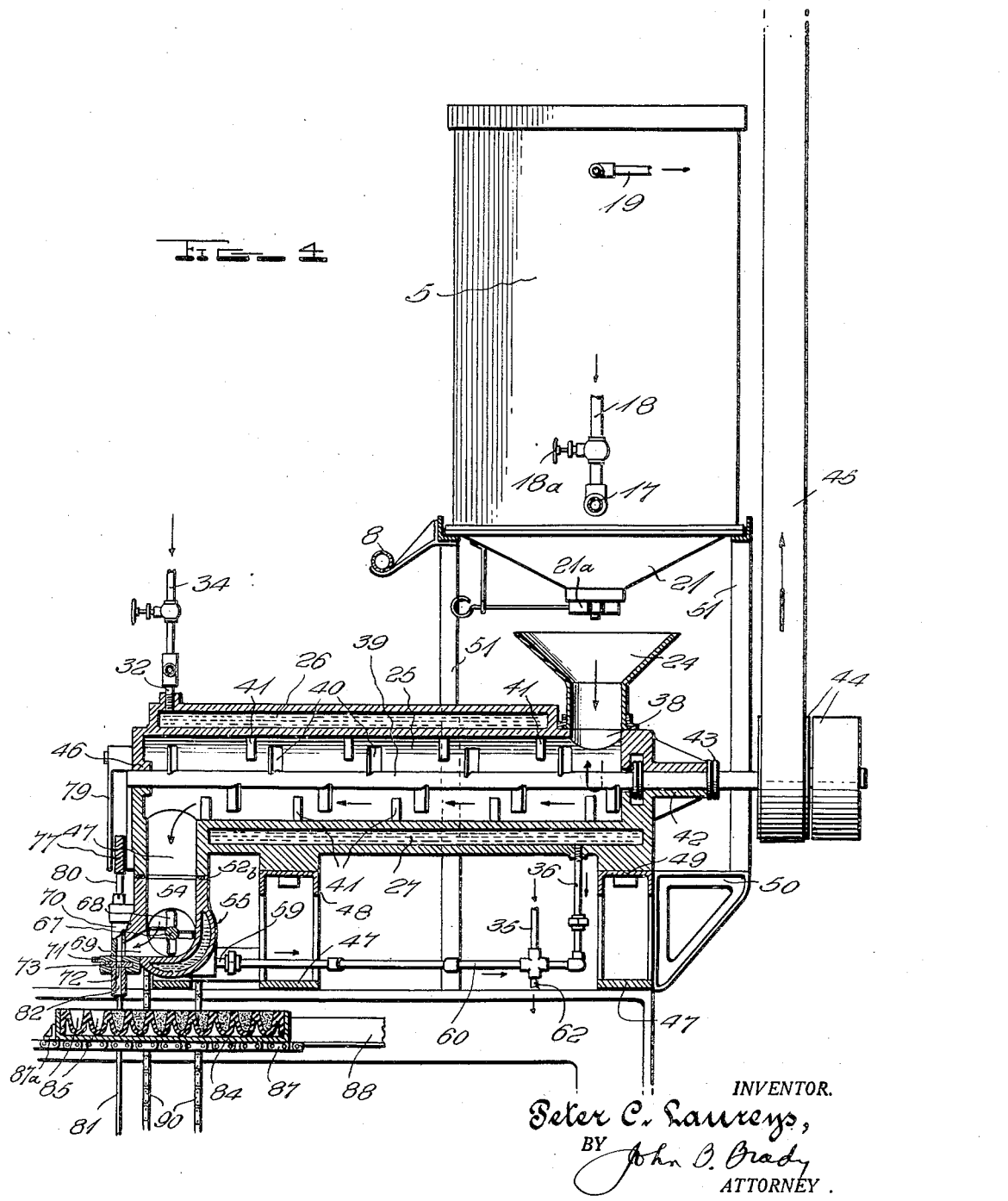
INVENTOR.
Peter C. Laureys,
BY
ATTORNEY.

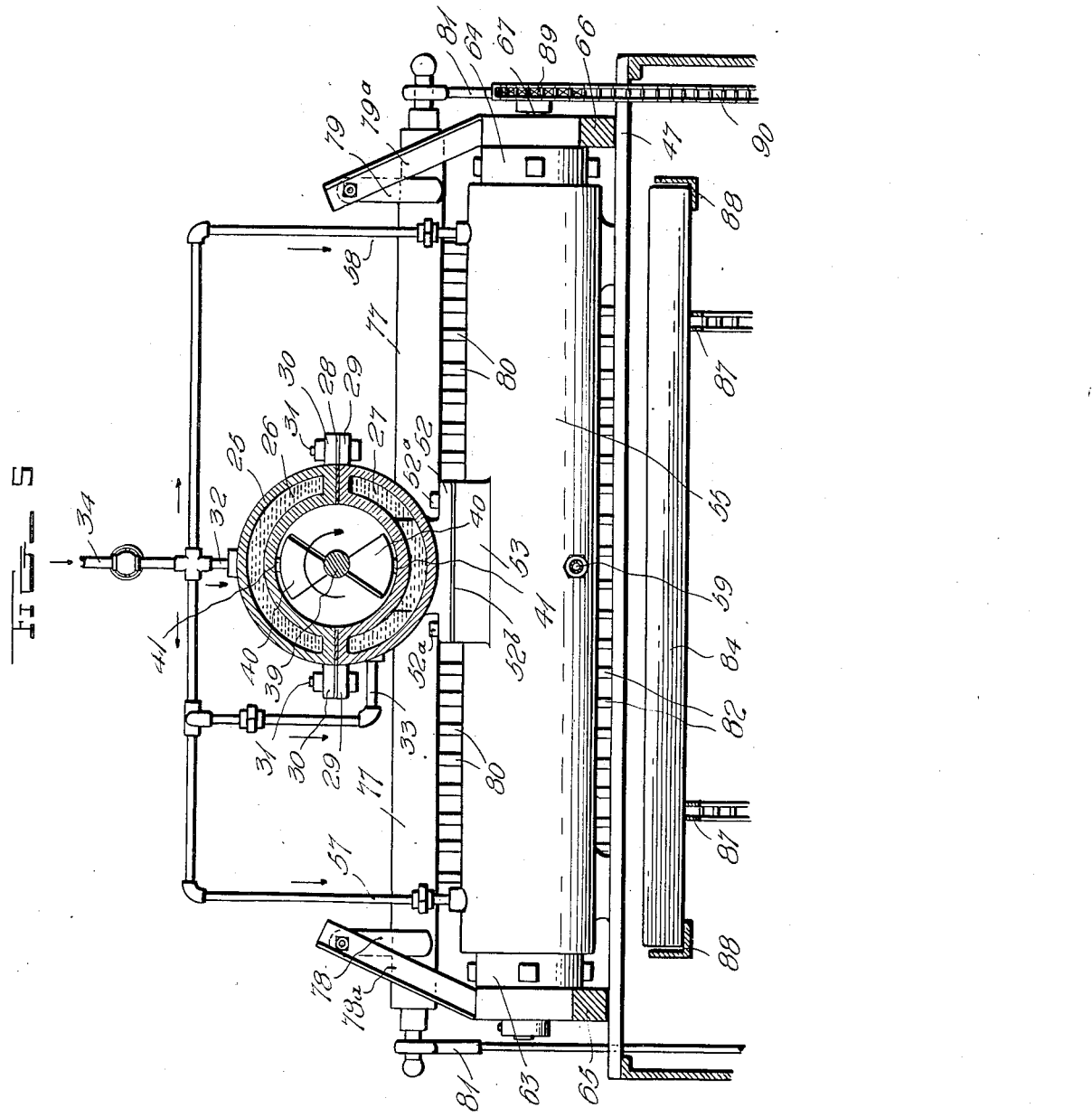

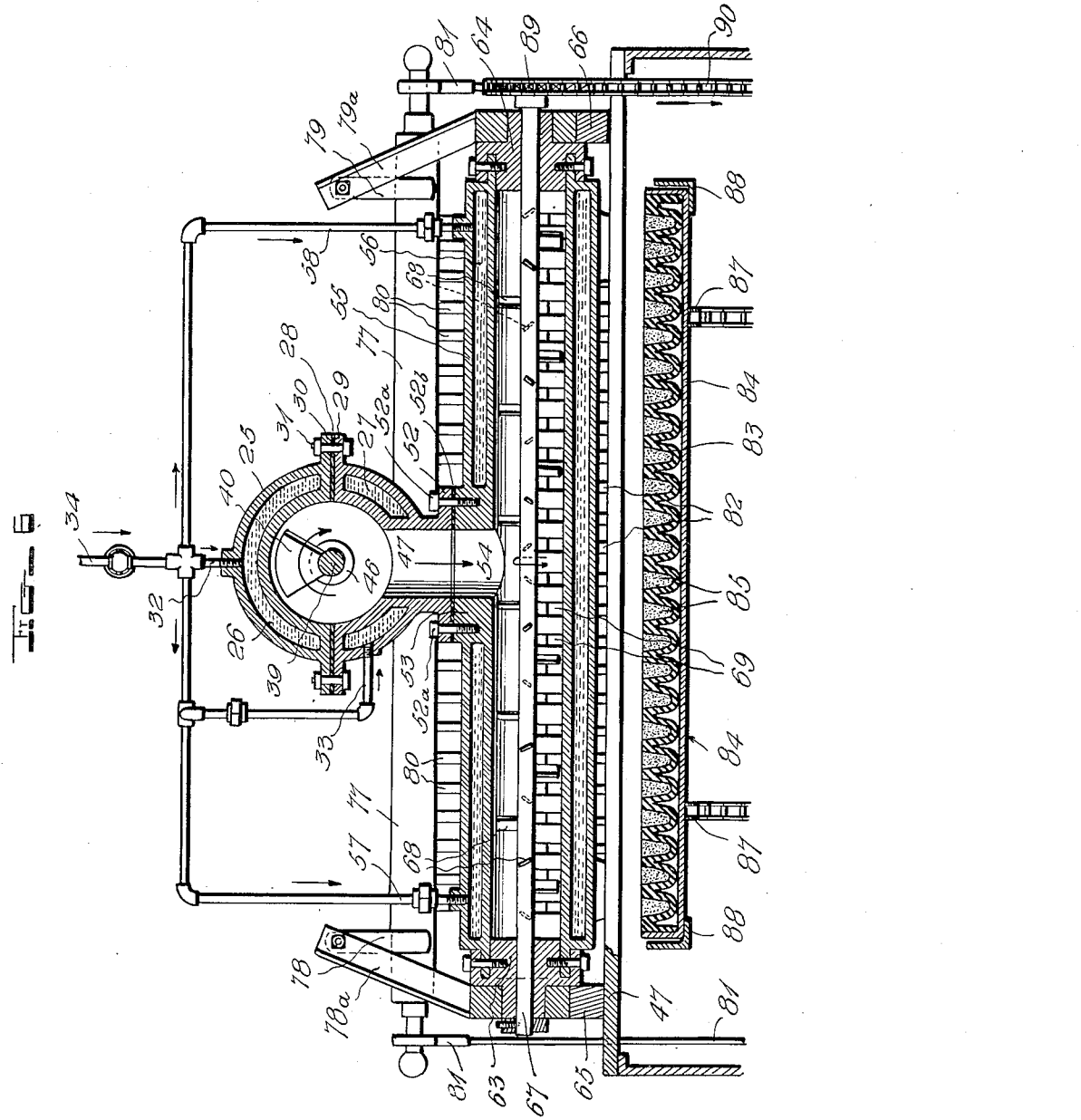

Patented Mar. 17, 1931

1,796,934

UNITED STATES PATENT OFFICE

PETER C. LAUREYS, OF JERSEY CITY, NEW JERSEY, ASSIGNOR TO LOFT, INC., OF LONG ISLAND CITY, NEW YORK, A CORPORATION OF DELAWARE

APPARATUS FOR MAKING CONFECTIONS

Application filed March 17, 1930. Serial No. 436,459.

My invention relates broadly to a method and apparatus for producing a cream or fondant confection and more particularly to a method of treating a syrup for producing a fondant or cream and distributing such fondant or cream to molds in the manufacture of candy.

One of the objects of my invention is to provide a method of manufacturing fondant or cream in the manufacture of confections wherein graining of the fondant is prevented and a smooth cream product deposited in molds free of undesired graining effects.

Another object of my invention is to provide a compact mechanism for the manufacture of cream centers for candy wherein a syrup is cooked and pumped into a cooler with substantially no agitation and delivered to a beater in a manner which avoids graining, passed through the beater and directly conveyed to a multiplicity of depositors for directly filling a multiplicity of molds moved in timed relation to the operation of the depositor for filling the molds with charges of fondant of predetermined size.

A further object of my invention is to provide a method for distributing fondant to molds for producing candy centers without allowing the fondant to set and requiring remelting thereof before the distributing and depositing operation.

A still further object of my invention is to provide a method of distributing fondant to molds which considerably decreases the length of time heretofore required in producing fondant charges while preserving a smooth structure of the fondant or cream and avoiding graining heretofore experienced in processes involving the remelting of the fondant before the discharge thereof to molds.

Another object of my invention is to provide an apparatus for delivering fondant in predetermined charges directly to molds which are moved in timed relation to the operation of the depositor where the fondant is advanced through the apparatus from a syrup cooker in a manner avoiding graining thereof and without any process of remelting of the fondant.

Still another object of my invention is to provide a construction of machine for discharging fondant to molds in charges of predetermined size where the fondant is formed directly from the syrup delivered from a cooker and conveyed to a depositor with means for predetermining the temperature of the syrup and fondant throughout its path of travel from the cooker to the molds.

Other and further objects of my invention reside in the method of producing fondant and the construction of confectionery apparatus as set forth more fully in the specification hereinafter following by reference to the accompanying drawings, in which:

Figure 1 is a schematic view showing the arrangement of syrup cooker, cooler, conveying means for the syrup, the beater, distributor, depositor, and mold conveyor forming the confectionery apparatus of my invention; Fig. 2 is a side elevation of the syrup beater and showing the fondant distributor in lateral cross-section conveying fondant to the depositor for discharge to molds therebeneath; Fig. 3 is a plan view of the beater, distributor, depositor, and mold conveyor employed in the apparatus of my invention; Fig. 4 is a longitudinal cross-sectional view through the syrup beater and a lateral cross-sectional view through the fondant distributor illustrating the syrup cooler in side elevation; Fig. 5 is a rear view of the distributor illustrating the beater in lateral cross-section on line 5—5 of Fig. 3; and Fig. 6 is a longitudinal cross-sectional view taken through the distributor on line 6—6 of Fig. 3.

Heretofore in the art methods of depositing fondant in molds have involved a considerable amount of expensive machinery occupying a large physical area for the installation thereof. Such processes have involved the cooking of a quantity of sugar and water to produce a syrup of required density. This syrup is flowed by gravity through a pipe line from the cooker which is generally located on the upper floor of the factory to a cooler where it is allowed to cool to approximately 100° F. Because of the available space conditions it is sometimes necessary to pump the syrup from the cooker to the cooler.

This pumping process, as hereinafter pointed out, is undesirable by reason of the graining effect which may be observed in the ultimate fondant. The syrup is delivered to a beater where it is subjected to continuous agitation which works the syrup into a white cream. Crystallization of a part of the syrup mass takes place, and when the agitation is rapid the sugar is caused to grain and the mass produces a mixture of small sugar crystals and syrup. The rapidity and amount of agitation greatly influences the size of these crystals and determines the smoothness of the cream. As this cream leaves the beater it hardens almost instantaneously.

Heretofore the cream has been cooled in large tubs and hardened in a solid mass. It has been necessary to break up the hardened mass and deposit the material in bulk in kettles to which heat is applied for the remelting of the bulk with additional syrup, flavor, etc., added thereto. The cream is then piped to a mogul where it is deposited while still hot into corn starch molds. These molds are formed in trays which are filled with corn starch and in which indentations have been made by a forming die to form the corn starch into a multiplicity of pockets which receive the charges of the cream. The cream is still hot at the time of discharge into the molds and must be allowed to set and cool substantially for a period of twenty-four hours before the cream is hard enough to be covered with chocolate. The excessive agitation of the syrup is readily observable in the graining effect existing in the ultimate creams. The hardening of the cream and the remelting thereof require an extended time period and may introduce impurities. The depositing of the cream at high temperature requires a subsequent cooling process involving a considerable expenditure of time and complicated and expensive machinery for conveying the charges thus formed. The starch molds introduce conditions which may be unsanitary. The mogul is a massive piece of machinery requiring a large area for its installation and involving a considerable number of parts subject to wear and replacement. A drying room of large size must be provided to receive the starch trays. Weather conditions have a detrimental effect upon the character of the starch molds, and the extended time period required for the production of creams in the process described is a decided disadvantage.

In the process of my invention I am enabled to compactly arrange the parts of the confectionery apparatus within a small physical area and yet produce fondant or creams which are soft and smooth in their characteristics within a relatively short time limit. I provide a cooker in which the desired mixture of sugar and water is prepared and the syrup thus obtained flowed to a multiplicity of coolers disposed in a position over a hopper. The method of introducing the syrup into the coolers is extremely important. Instead of permitting the syrup to splash into the syrup fluid within the cooler chamber by falling from the delivery pipe into the cooling chamber as has heretofore been the practice, I introduce the syrup into the cooler at a point adjacent the base of the cooler and flood the syrup into the cooler in such a manner that the syrup level in the cooler gradually rises with a flooding action but without agitation of the syrup. This flooding operation avoids graining and greatly improves the quality of the creams which are subsequently produced. The cooler chamber is so constructed that the cross-sectional area gradually enlarges from the outlet adjacent one side of the cooling chamber to a relatively larger cross-sectional area adjacent the top of the cooling chamber. The base of the cooling chamber terminates in a discharge orifice under which a hopper is positioned to direct the syrup into a beater which is disposed below the hopper. The beater is designed to avoid excessive agitation of the syrup for preventing graining of the cream. Both the cooler and the beater are provided with means for predetermining the temperature of the syrup and cream. The beater delivers the partially beaten cream to a distributor cylinder which extends laterally with respect to the beater at the discharge end thereof. The distributor cylinder is also provided with means for predetermining the temperature of the fondant therein. The beating of the cream which is only partially completed in the beater is finally completed in the distributor cylinder. A rotatable shaft is journaled within the distributor cylinder on an axis substantially normal to the center line of the beater and is provided with radially extending blades which are disposed in such angular relationship as to advance the fondant from the center point at which the fondant is admitted to the distributor cylinder in directions toward each end of the distributor cylinder. The distributor cylinder is provided with a multiplicity of outlet ports adjacent the front thereof for the delivery of fondant to charge receiving cylinders forming part of the depositor. A vertically moving head carrying a multiplicity of pistons movable in the discharge cylinders is arranged adjacent the distributor cylinder and is moved in timed relation to the movement of a cut-off device which is reciprocative beneath the discharge cylinders and in timed relation to a tray moving mechanism.

In the apparatus of my invention I employ trays carrying rubber molds into which the fondant is discharged. The timing of the mechanism is such that when the discharge cylinders are cut off the tray carrying rubber molds is shifted a predetermined distance to bring another row of rubber molds into alignment beneath the discharge cylinders, whereupon the pistons in the discharge cylinders are subjected to movement for forcing a predetermined bulk of fondant into a row of rubber molds beneath. The fondant hardens within a time interval of not more than ten minutes after discharge into the molds, and is ready for the cooling process within twenty minutes thereafter. It will therefore be seen that a drying period of twenty-four hours, as heretofore required in the art, is wholly unnecessary. The cream centers set during a time interval of not more than ten minutes and are then knocked out of the rubber molds. The discharge of the fondant into the molds takes place at a temperature of approximately 105 degrees instead of at a temperature of 145 degrees as heretofore required and accordingly there is no cooling period necessary.

In order that the several steps may be more clearly understood I have designated alphabetically the series of steps involved in the process or method of my invention as follows:

A. Sugar and water cooked to form clear syrup.
B. Syrup flooded into cooler.
C. Syrup maintained at predetermined temperature.
D. Syrup discharged to beater.
E. Partial beating action for creaming in beater while maintaining the cream at predetermined temperature.
F. Discharge to distributor cylinder and completion of beating action while maintaining the cream at a predetermined temperature and moving cream to opposite ends of the distributor cylinder.
G. Simultaneous operation of pistons in charge receiving cylinders for distributing cream to filling molds.
H. Setting of creams in molds.
I. Coating of creams.

In order that my invention may be more fully understood a detailed description of the parts of the mechanism according to the above referred to sections will be given under paragraph headings corresponding to the alphabetical arrangement hereinbefore listed.

A

In Figure 1 sugar and water are mixed in the cooker designated by reference character 1 and boiled to form a clear syrup which is delivered through pipe line 2 under control of valve 3 to the lower portion 4 of the cooling chamber 5 and to the lower portion 6 of the cooling chamber 7 through pipe line 8 under control of valve 9.

B

The cooling chambers 5 and 7 are each closed at the base thereof by a tapered end closure at 21 and 22, respectively, with cut-off valves 21a and 22a in the bottom thereof. The syrup instead of being poured into the cooling chambers 5 and 7 with the resulting fall and graining effect therein, is flooded into each of the cooling chambers in such manner that the level of the syrup gradually rises in the cooling chamber.

C

Each cooling chamber is provided with a cooling system. Chamber 5 includes vertically extending pipes 10 interconnected by headers 11 and 12 through which cooling water circulates. Cooling chamber 7 includes vertically extending pipes 14 interconnected by laterally extending headers 15 and 16. The inlet to the cooling system is designated at 18 connecting through T connection 17 with the headers 11 and 16. A cooling outlet is designated at 19. The syrup is maintained at predetermined temperatures for the passage of cooling water through the headers 11, 16, pipes 10 and 14 and outlet 19 as illustrated.

D

The syrup is discharged to the beater cylinder 25 through a hopper 24 which is positioned above the inlet port 38 in the beater cylinder. The beater cylinder is provided with a multiplicity of inwardly directed fins 41 between which the laterally extending blades 40 on rotatable shaft 39 extend. The rotatable shaft 39 is journaled in the beater cylinder 25 at one end as indicated at 42 and at the opposite end as indicated at 46. In order to maintain the rotatable shaft 39 in position suitable thrust bearings 43 are provided thereon as shown, for the longitudinal stress on shaft 42 due to the continued resistance offered by the mass of fondant is extremely heavy as the blades 46 on the shaft 42 are subjected to heavy thrust against the action of the fondant as it advances toward the discharge port 47. The shaft is driven by fast and loose pulleys over which belt 45 operates. The end of beater cylinder 25 is provided with a discharge port 47 which leads to the distributor cylinder 55.

E

The beater is water jacketed as represented at 26 and 27, the parts of the beater cylinder being interconnected by means of aligned lugs 29 and 30 connected by suitable bolts indicated at 31. A gasket 28 is provided for sealing the parts of the beater cylinder and preventing leakage of the fondant during the course of the beater action. Cooling water is delivered to water jacket 26 through pipe 32 which connects to the main water inlet at 34. Cooling fluid is admitted to cooling jacket 27 to pipe 33. The water is discharged from water jacket 26 to pipe 35 and is discharged from jacket 27 to pipe 36 for discharging the cooling fluid through the main waste pipe 62. The syrup is only partially beaten in the beater cylinder 25 and considerable care is taken to prevent excessive beating to avoid graining in the final product. Heretofore in the remelting processes which have been described, multiple channel beaters have been employed and often the beating action produces such agitation that undesired crystallization takes place to the detriment of the final product.

F

The fondant is discharged to the distributor cylinder 55 through discharge port 47 of the beater cylinder 25 and inlet port 54 of the distributor cylinder 55. A suitable connection is provided between the beater cylinder 25 and the distributor cylinder 55 by means of the cast portions 52 and 53 secured by suitable screws 52a and sealed by gasket 52b. The distributor cylinder 55 is closed at opposite ends by members 63 and 64 suitably supported by cross-bars 65 and 66 on frame 47, as more clearly shown in Figs. 3, 5 and 6. The distributor cylinder 55 is water cooled as represented at 56. The cooling fluid is admitted at opposite ends of the distributor cylinder 55 through pipe connections 57 and 58 and flows through the cooling jacket 56 to the center to a discharge outlet 59. The discharge outlet 59 connects to discharge pipe 60 which leads to the waste pipe connection 62. It will be observed that cooling water of low temperature is introduced at opposite ends of the distributor cylinder 55 and circulates to a discharge at the center 59 in directions opposite to the direction of movement of the fondant through the distributor cylinder. The distributor shaft is shown at 67 journaled in the end closures 63 and 64 of the distributor cylinder 55. The distributor shaft carries a multiplicity of radially extending blades 68 which are formed into two sets on each side of the center of the inlet port 54 and disposed in opposite angular directions for movement of the fondant without excessive agitation to positions of discharge through ports 69 formed in the lower part of the distributor cylinder 55.

G

Along the front of the distributor cylinder 55 there is provided a row of fondant receiving cylinders 70 each of which connects by means of a port 69 with the distributor cylinder 55 in such manner that each cylinder receives a charge of fondant which is delivered thereto by movement of the distributor shaft 67. The several charge receiving cylinders 70 terminate in a head 71 at the base thereof, forming a guide having a cut-off plate 73 containing a multiplicity of apertures 72 adapted to be aligned with the bore in each discharge cylinder 70 for enabling the fondant to be discharged to the molds beneath the discharge orifices 82 under pressure derived from the downward movement of pistons 80. Pistons 80 are carried by a cross-head 77 which may be reciprocated by suitable mechanism 81 in timed relation to the movement of the cut-off plate 73. The cross-head 77 is confined to vertical movement within narrow limits controlled by guides 78 and 79 supported by means of brackets 78a and 79a. The cut-off plate 73 is moved by a connecting head 74 through a link 75 operated by a bell crank mechanism 76 in timed relation to the vertical movement of cross-head 77. Beneath the discharge orifices 82 I arrange the mold conveying apparatus consisting of trays 84 which are supported slidably upon the confining channels 88 and carried forward in a step-by-step predetermined motion by endless chain conveyor 87 having projections or gripping elements 87a, as shown more particularly in Fig. 2. The trays 84 each receive a flexible rubber mold which I have designated at 83 as including a plurality of pocket-like depressions 85 for receiving the charges of fondant which I have represented at 86. The molds are formed in rows of twenty-four pockets 85 according to the number of discharge orifices and extending in alignment with the discharge orifices 82, and there are usually ten such rows in each rubber mold 83. As the fondant is distributed along the distributor cylinder 55, and is fed out to the discharge organization 70, the strokes of the pistons 80 serve to force charges of fondant into the molds which advance step by step for that distance which will bring the center of the molds beneath the discharge orifice 82. The mechanism of the apparatus is such that while the tray 84 is being advanced the set of pistons 80 is moving vertically so that when the pistons 80 reach the upper limit of their stroke the rubber mold is aligned preparatory to receiving the succeeding fondant charges. While the pistons 80 are rising the cut-off plate 73 has moved laterally through bell crank mechanism 76 to cut off the discharge of fondant through the discharge orifices 82 preparatory to movement to a position which will align ports 72 with the bores of the cylinders for effecting a filling operation of the molds.

The distributor shaft 67 is continuously driven through chain 90 engaging a sprocket 89 on the end thereof and timed in operation with reference to the beater cylinder 39 to secure sufficient movement of the fondant without excessive agitation and thus eliminating excessive crystallization of parts of the fondant with the undesired graining effect in the resultant fondant charges.

H

When the trays 84 are filled with the fondant charges which are delivered to the upper molds these trays are moved to a rack enabling the creams to set for a period of not more than ten minutes, after which the creams are ready for a cooling process.

I

The creams are removed from the molds by appropriate means and are ready for any of the usual coating processes within twenty minutes after being deposited in the molds and within ten minutes after the creams have been allowed to set. Heretofore creams have not been ready for the coating process for a period of twenty-four hours after being deposited in the molds, and it will therefore be seen that the process of my invention considerably increases the rate of production and thereby reduces overhead costs and inherent expense in the manufacture of candy.

The beater cylinder 25 is suitably mounted on the frame 47 of the apparatus by means of laterally extending members 48 and 49. The cooling chambers 5 and 7 are suitably mounted above the beater cylinder by means of frame members 51 which may be erected on the frame 47 of the apparatus by means of bracket 50.

I have not attempted to illustrate the mechanism which coordinates the movement of the several parts of the apparatus, as such movements are set forth in detail in Letters Patent 1,169,602 to A. L. Bausman, dated January 25, 1916. I have, however, shown in detail all parts of the cooling system, the connections of the cooker thereto, the means for flooding the syrup into the cooling system, the delivery means for the syrup into the beater cylinder, the relation of the distributor to the beater and the method of feeding the fondant from the distributor cylinder to the molds.

For a complete description of the construction of the distributor shaft 67 and blades 68 which are mounted thereon, reference is made to copending application Serial No. 436,443 filed March 17, 1930, by William F. Heller, entitled "Distributing apparatus for fondant, cream and other confections".

The apparatus of my invention has proven highly successful in the production of fondant or cream for candies. The direct run of the material through the machine for forming the sugar fondant is a decided advantage over the remelting process heretofore required. The avoidance of remelting and storing of fondant in tubs is a considerable advance in the art. The setting of the cream centers for a period of twenty-four hours heretofore required has been reduced to a time interval of not more than ten minutes in the system of my invention. The cream centers produced according to my process can be covered with chocolate within twenty minutes after being deposited in the molds due to the fact that the temperature at which the fondant is deposited is approximately 105° F. instead of at temperatures heretofore employed which have averaged 145° F.

My invention eliminates the use of starch trays with the unsanitary conditions accompanying the use of starch. The mogul described at length in the aforesaid Letters Patent 1,169,602 to Bausman is eliminated. A drying room or drying machine is unnecessary in the method employed in my invention, and regardless of weather conditions the creams will reach that degree of hardness within a twenty minute interval after the deposit thereof to allow coating or subsequent treatment.

My invention is particularly suitable for the manufacture of cast cordial fruit and maraschino cherries as the fondant cast on the cherry is practically cold and as the fondant sets within a time interval of ten minutes there is no chance for the juice in the cherry or fruit to melt the fondant until the same is coated with chocolate confection. Owing to the natural mellowing of unremelted fondant the maraschino cherries turn the fondant to a cordial in only a fraction of the time it would require to liquefy a remelted fondant.

One of the marked advantages in the process of my invention is that the cream centers after being coated become soft and mellow which is extremely pleasing to the taste. It will be realized that there has been no remelting of the fondant in the process of my invention and that care has been taken to avoid excessive agitation so that the soft and mellow cream within the chocolate envelope is free of graining effects.

While I have described the method and apparatus employed in carrying out my invention in one of its preferred embodiments, I desire that it be understood that modifications may be made by those skilled in the art and that no limitations are intended upon my invention except those imposed by the scope of the appended claims.

What I claim as new and desire to secure by Letters Patent of the United States is as follows:

1. In an apparatus for manufacturing candy centers, a beater for fondant having an inlet port at one end and a discharge port at the opposite end thereof, a distributor cylinder connected to the discharge port of said beater, a rotatable distributor journaled in said distributor cylinder and a multiplicity of charge delivering devices connected with said distributor cylinder, and means cooperatively related to said charge delivering devices for depositing charges of predetermined size to molds.

2. In an apparatus for manufacturing fondant, a beater for fondant having an inlet port at one end and a discharge port at the opposite end, a distributor cylinder extending on an axis normal to the axis of said beater, said distributor cylinder having an inlet port substantially at the center of the top thereof registering with the discharge port of said beater, a multiplicity of charge delivering devices connected with said distributor cylinder, and a rotatable distributor journaled in said distributor cylinder for moving fondant delivered by said beater in opposite directions from the center of said beater toward the remote ends thereof.

3. In a machine for manufacturing fondant, a beater for fondant including an intake port at one end and a discharge outlet at the other end, a distributor cylinder having a central intake port aligned with the discharge outlet of said beater cylinder, means for maintaining said beater and said distributor cylinder at predetermined temperature, charge delivering means connected with said distributor cylinder, and a rotatable distributor journaled in said distributor cylinder and extending on opposite sides of the inlet port for moving the fondant from opposite directions from said intake port toward each end of the distributor cylinder for feeding the charge delivering means.

4. In a machine for manufacturing fondant, a beater cylinder having an inlet port for syrup at one end and a discharge port for partially formed fondant at the opposite end, a distributor cylinder having a central inlet port registered with a discharge port on said beater and extending along an axis normal to the axis of said beater, a plurality of charge delivering devices connected to said distributor cylinder, and a rotatable beater and distributor journaled in said distributor cylinder for directly acting upon the partially formed fondant delivered from said beater and completing the formation and conveying the same to said charge delivering devices.

5. In a machine for manufacturing fondant, a beater for fondant having an inlet port for syrup adjacent one end thereof and a discharge port for partially formed fondant adjacent the lower portion of the opposite end of said beater, a distributor cylinder extending beneath said beater along an axis substantially normal to the axis of said beater, said distributor cylinder having a central intake port registering with the discharge port in said beater, a multiplicity of charge delivering devices connected to said distributor cylinder, and a rotatable distributor journaled in said distributor cylinder and having means for moving the fondant from the center toward each end thereof while completing the beating action thereon.

6. In a machine for manufacturing fondant, a beater for fondant having an inlet port for syrup adjacent one end thereof and a discharge port for partially formed fondant adjacent the lower portion of the opposite end of said beater, a distributor cylinder extending beneath said beater along an axis substantially normal to the axis of said beater, said distributor cylinder having a central intake port registering with the discharge port in said beater, a multiplicity of charge delivering devices connected to said distributor cylinder, a rotatable distributor journaled in said distributor cylinder and having means for moving the fondant from the center toward each end thereof while completing the beating action thereon, and means connected to said beater and to said distributor cylinder for predetermining the temperature of the fondant throughout the treatment thereof in the beater and in the distributor cylinder.

7. In a machine for manufacturing fondant, a beater having a syrup receiving port adjacent one end thereof and a discharge port for partially formed fondant in the lower portion of the opposite end thereof, a fluid circulating jacket surrounding said beater, a distributor cylinder having an inlet port in the center of the top portion thereof and interconnected with the discharge port in said beater, means for distributing measured quantities of fondant to molds from a plurality of positions along said distributor cylinder, a fluid cooling jacket surrounding said distributor cylinder, fluid supply means connected to each of said fluid cooling jackets, means for discharging the cooling water from said fluid cooling jackets, and a rotatable distributor in said distributor cylinder for completing the beating of the fondant delivered from said beater and moving the fondant to said discharging means.

8. In a machine for manufacturing fondant, a beater having an inlet port for syrup adjacent one end thereof and a discharge port for fondant adjacent the opposite end thereof, a distributor cylinder having a central connection with said discharge port and extending on an axis beneath said beater in a line substantially normal to the axis of said beater, a multiplicity of means connected to said distributor cylinder for discharging measured quantities of fondant to molds, a rotatable distributor in said distributor cylinder, and means closing the ends of said distributor cylinder and providing bearings for journaling said rotatable distributor in a central position within said distributor cylinder.

9. In a machine for manufacturing fondant, a beater having an inlet port for syrup adjacent one end thereof and a discharge port for fondant at the lower portion of the opposite end thereof, a distributor cylinder having an inlet port adjacent the center thereof connected with the discharge port in said beater, a fluid jacket surrounding said beater and having projections on each end thereof, plug members telescopically secured in each end of said distributor cylinder, and a rotatable distributor journaled in said plug members and driven to complete the formation of fondant while conveying the fondant in predetermined charges to a multiplicity of molds.

In testimony whereof I affix my signature.

PETER C. LAUREYS.